(12) United States Patent
Omata et al.

(10) Patent No.: US 9,203,287 B2
(45) Date of Patent: Dec. 1, 2015

(54) STARTER HAVING OPTICAL SPEED SENSOR ON CLUTCH OUTER PERIPHERY

(75) Inventors: Shigehiko Omata, Mito (JP); Koji Harada, Hitachinaka (JP); Shigenori Nakazato, Mito (JP); Mitsuhiro Arai, Hitachinaka (JP); Shouta Ohkoshi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 504 days.

(21) Appl. No.: 13/574,743

(22) PCT Filed: Aug. 25, 2010

(86) PCT No.: PCT/JP2010/064406
§ 371 (c)(1),
(2), (4) Date: Oct. 10, 2012

(87) PCT Pub. No.: WO2011/108133
PCT Pub. Date: Sep. 9, 2011

(65) Prior Publication Data
US 2013/0119831 A1    May 16, 2013

(30) Foreign Application Priority Data
Mar. 2, 2010 (JP) ................. 2010-045615

(51) Int. Cl.
| H02K 7/10 | (2006.01) |
| F02N 15/02 | (2006.01) |
| H02K 11/00 | (2006.01) |
| F02N 15/06 | (2006.01) |

(52) U.S. Cl.
CPC .......... *H02K 11/0015* (2013.01); *F02N 15/023* (2013.01); *F02N 15/067* (2013.01); *F02N 2200/041* (2013.01); *F02N 2200/048* (2013.01)

(58) Field of Classification Search
CPC ....... H02K 7/10; H02K 7/108; H02K 7/1085; H02K 7/11; F02N 15/02; F02N 15/022; F02N 15/023; F02N 15/06; F02N 15/062
USPC .............................. 310/68 B, 92, 94, 95, 100
See application file for complete search history.

(56) References Cited

U.S. PATENT DOCUMENTS

2003/0106766 A1 * 6/2003 Johnson et al. ........... 192/103 R
2004/0129821 A1 * 7/2004 Priest et al. .................... 242/394
(Continued)

FOREIGN PATENT DOCUMENTS

EP    1041275 A1 * 10/2000 ............. F02N 11/08
JP    5-44523          2/1993
(Continued)

OTHER PUBLICATIONS

Machine translation of JP2005330813A (Dec. 2005).*
(Continued)

*Primary Examiner* — Michael Andrews
(74) *Attorney, Agent, or Firm* — Foley & Lardner LLP

(57) ABSTRACT

Starter for vehicle-use engine which can detect a rotational speed signal in a stable manner even when a clutch cover is mounted on an outer periphery of a clutch outer of a one-way clutch. The starter D for a vehicle-use engine which transmits a rotational drive force of a stator to a ring gear of a crankshaft by a pinion of the starter includes: a one-way clutch which is arranged between the pinion and an armature shaft of the stator; and a rotational speed detection device which detects a rotational speed of the pinion. A part to be detected for a rotational speed is formed of through holes formed on a circumference of the clutch cover, and a circular circumferential groove formed on an outer peripheral surface of a clutch outer along the circumference on which the through holes are formed.

6 Claims, 5 Drawing Sheets

(56) References Cited

U.S. PATENT DOCUMENTS

2006/0185427 A1* 8/2006 Ono et al. .................... 73/118.1
2008/0018485 A1* 1/2008 Kadwell et al. ............... 340/630

FOREIGN PATENT DOCUMENTS

| JP | 6-83958 | 12/1994 | | |
|---|---|---|---|---|
| JP | 2000-314364 | 11/2000 | | |
| JP | 2005330813 A | * 12/2005 | ............. | F02N 11/08 |
| JP | 4237150 B2 | 12/2008 | | |
| JP | 4214401 B2 | 1/2009 | | |

OTHER PUBLICATIONS

Machine translation of EP1041275A1 (Oct. 2000).*
PCT International Search Report on application PCT/JP2010/064406 mailed Nov. 22, 2010; 2 pages.

* cited by examiner

OUTPUT OF ROTATIONAL
SPEED DETECTION SENSOR (a)

(b)

STARTER HAVING OPTICAL SPEED SENSOR ON CLUTCH OUTER PERIPHERY

TECHNICAL FIELD

The present invention relates to a starter for an idling stop.

BACKGROUND ART

In general, in starting an engine, a pinion which transmits power of a starter to an engine for cranking the engine is pushed out by a solenoid coil so that the pinion is meshed with a ring gear connected to a crankshaft of the engine and thereby cranking of the engine is performed with the use of power of the starter. The starter for an idling stop is configured such that, when a vehicle is stopped temporarily, the pinion is pushed out to be meshed with the ring gear after the engine is brought into a stop state. Here, there may be a case where a driver makes a restart request by suddenly changing his mind although he firstly wanted to stop his vehicle temporarily. However, even when such a restart request is made during a fall of the rotation of the engine, a restart is not performed until the rotation of the engine is brought into a stop state and a time lag occurs before the restart is performed.

In view of the above-mentioned circumstance, in Japanese patent 4214401 (patent document 1), when a restart request is made during a fall of the rotation of an engine, power is supplied to a starter so as to idle a pinion, rotational speeds of the pinion and a ring gear are respectively detected, and a pinion is pushed out to be meshed with a ring gear at a point of time that the respective rotations synchronize with each other thus restarting the engine rapidly. In Japanese patent 4237150 (patent document 2), a signal outputting portion having a convex and concave shape is formed on an outer peripheral surface of a cylindrical outer peripheral wall of a clutch outer of a starter-use one-way clutch, and a rotational speed of a crankshaft is detected by a signal detection sensor.

SUMMARY OF INVENTION

Technical Problem

In patent document 1, a specific method of detecting a rotational speed of the pinion is not described. Further, the sensor of patent document 2 is provided for detecting the rotational speed of the crankshaft, and is not provided for detecting a rotational speed of the pinion. That is, the related art has a drawback that these patent documents 1, 2 do not take into account a method of specifically detecting a rotational speed of a pinion which is mounted on a starter for an idling stop.

Accordingly, it is an object of the present invention to provide a starter for an idling stop which can detect a rotational speed of a pinion.

Solution to Problem

To overcome the above-mentioned drawback, one preferred aspect of the present invention is as follows.

A starter according to the present invention includes: a pinion which transmits a rotational drive force of the starter to a ring gear of a crankshaft of an engine; an armature shaft which pushes out the pinion to the ring gear; a one-way clutch which is arranged between the pinion and the ring gear so as to prevent the transmission of a rotational drive force of the engine to an armature; and a rotational speed detection device which detects a rotational speed of the pinion, wherein the rotational speed detection device includes: a part to be detected for a rotational speed which is formed on a periphery of the one-way clutch; and a rotational speed detection sensor which detects the part to be detected for a rotational speed.

Advantageous Effects of Invention

According to the present invention, it is possible to provide a starter for an idling stop which can detect a rotational speed of a pinion.

BRIEF DESCRIPTION OF DRAWINGS

FIG. 7(a) and FIG. 7(b) show another embodiment where a recessed portion is formed on a clutch outer, wherein FIG. 7(a) is a front view with apart broken away of the clutch outer, and FIG. 7(b) is a cross-sectional view of an essential part showing the positional relationship between the clutch outer and a rotational speed detection sensor.

DESCRIPTION OF EMBODIMENTS

Figure 1:
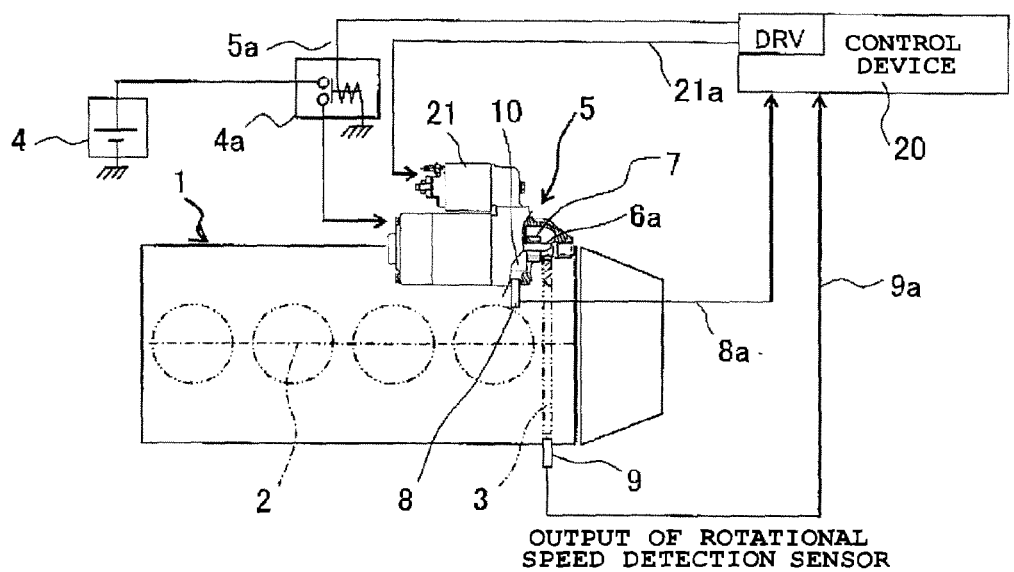
FIG. 1 is an overall constitutional view of a system including a starter.

Hereinafter, one embodiment is explained in detail in conjunction with drawings. In FIG. 1 to FIG. 4, a ring gear 3 is mounted on a crankshaft 2 of an engine 1. On the other hand, an armature 6 is rotatably supported in the inside of a starter 5 which generates a rotational drive force for starting the engine 1, and a pinion 7 is mounted on one end of an armature shaft 6a. The pinion 7 is meshed with the ring gear 3 in an engageable and disengageable manner so that a rotational drive force of the starter 5 can be transmitted to the engine 1. A rotational speed detection sensor 8 which detects a rotational speed of the pinion 7 is mounted on the starter 5.

A system shown in FIG. 1 is constituted of the engine 1, the ring gear 3 which is fixed to the crankshaft 2 of the engine 1, the starter 5 which includes the pinion 7 meshed with the ring gear 3, a battery 4 which constitutes a power source of the starter 5, a relay 4a, and the rotational speed detection sensor 8. Further, to automatically restart the engine after the engine is temporarily stopped, the system further includes a rotational speed detection sensor 9 for the ring gear 3 for detecting a rotational speed of the engine. When a condition for allowing a temporary stop of the engine is satisfied during driving of a vehicle, a control device 20 temporarily stops the engine, while when a restart condition is satisfied, the control device 20 restarts the engine 1 by rotating the starter 5.

Figure 2:
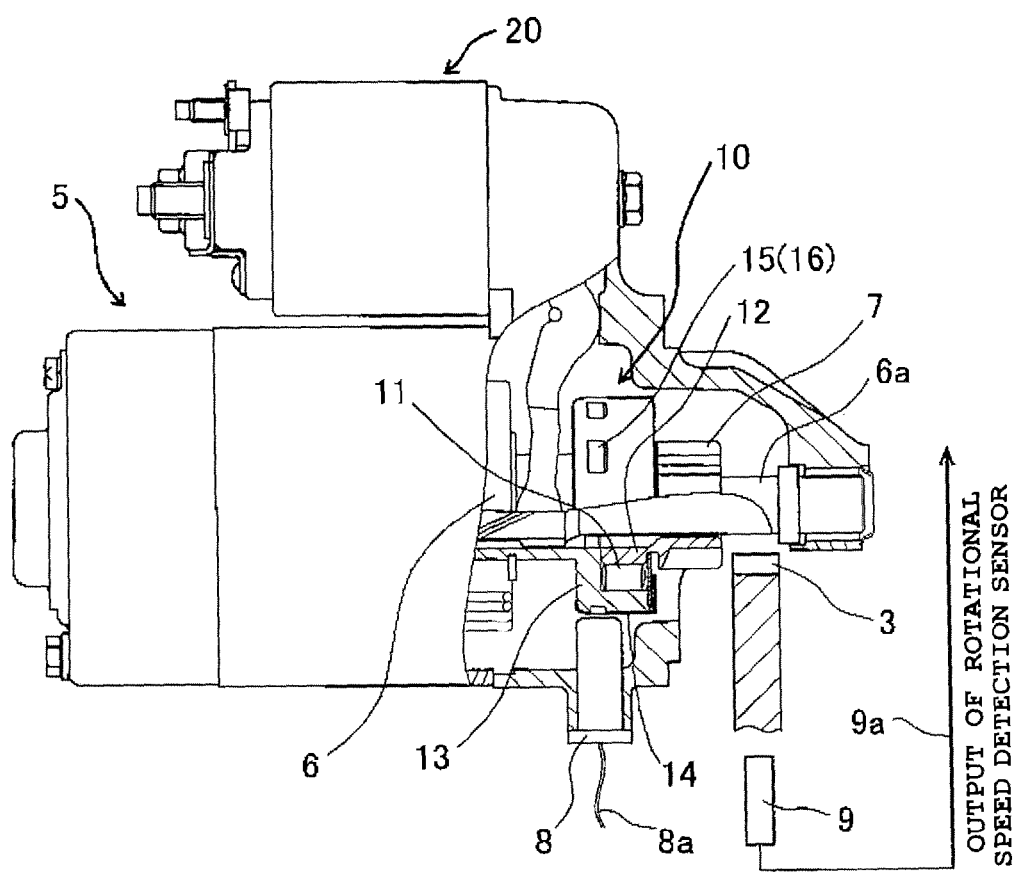
FIG. 2 is a view of the constitution with a part broken away of an essential part of the starter.
Figure 3:
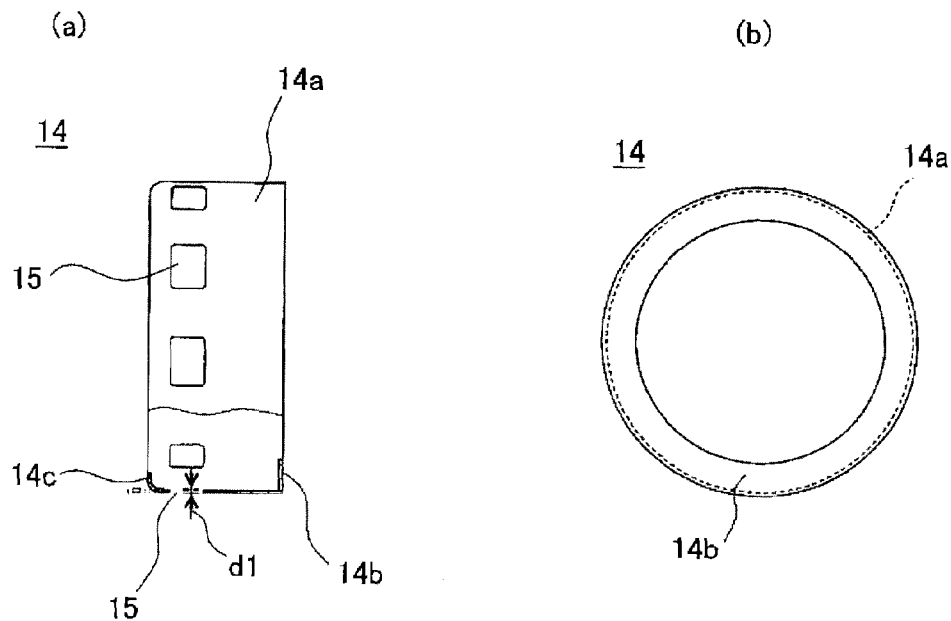
FIG. 3(a) and FIG. 3(b) are a front view and a side view with a part broken away showing a clutch cover.
Figure 4:
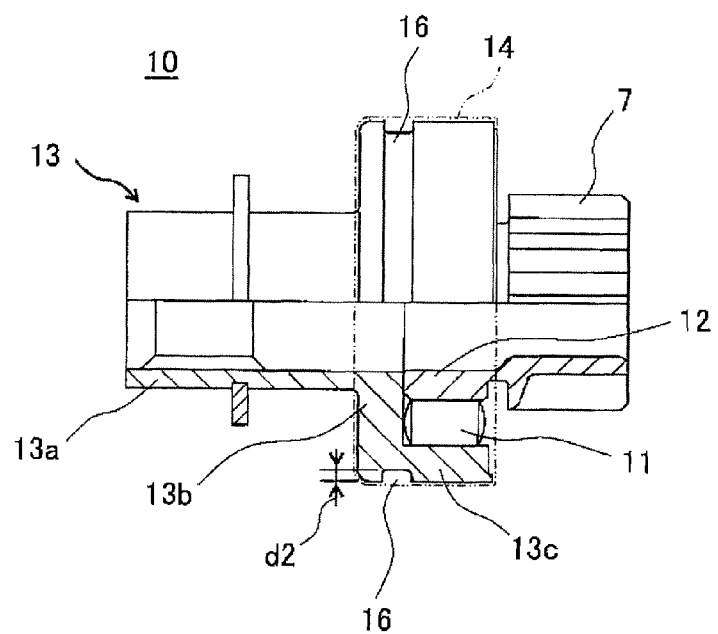
FIG. 4 is a front view of a clutch outer showing a state where the clutch cover is removed.

In FIG. 2, the starter 5 is a DC motor, and generates a rotational drive force when the armature 6 incorporated in the starter 5 receives the supply of power from the battery 4. The rotational drive force generated by the armature 6 is transmitted to the armature shaft 6a which constitutes an output shaft of the starter 5. A one-way clutch 10 is arranged between the armature shaft 6a and the pinion 7 for preventing a rotational drive force of the engine 1 from being transmitted to the armature 6 after the engine 1 is started. The rotational speed detection sensor 8 is arranged at a position where the rotational speed detection sensor 8 faces an outer peripheral portion of the one-way clutch 10 in an opposed manner from the outside in the radial direction (engine 1 side) of the outer peripheral portion, and detects a rotational signal of the one-way clutch 10. In this embodiment, a magnetic sensor is used as the rotational speed detection sensor 8.

The one-way clutch 10 includes: the pinion 7; a clutch inner 12, a clutch outer 13 and a clutch cover 14 which are arranged coaxially in an oppositely facing manner in the radial direction by way of rollers 11. The clutch inner 12 is integrally formed with the pinion 7, and is rotatably driven by way of the armature shaft 6a when the engine 1 is started.

The one-way clutch 10 is fitted in splines (not shown in the drawing) which are formed on the armature shaft 6a, and is movable in the axial direction. The one-way clutch 10 prevents the starter 5 from being rotated together with the rotation of the engine 1. The clutch outer 13 is separated from the rotation of the engine due to functions of the clutch inner 12 and the one-way clutch 10 which are rotated integrally with the pinion 7. Further, the rollers 11 connect/disconnect the clutch inner 12 and the clutch outer 13 to/from each other. An outer peripheral surface of the clutch outer 13 is covered with the clutch cover 14 so that the clutch cover 14 is fitted on the clutch cover 13.

The clutch outer 13 includes: a bearing portion 13a which is fitted on the armature shaft 6a; a disc portion 13b which extends in the outer peripheral direction from one end of the bearing portion 13a; and an outer peripheral portion 13c which extends in the horizontal direction from an outer periphery of the disc portion 13b. The rollers 11 are interposed between an inner peripheral surface of the outer peripheral portion 13c and an outer peripheral surface of the clutch inner 12. Due to such a constitution, the rotation of the clutch outer 13 in one direction is transmitted to the clutch inner 12 by way of the rollers 11. When the clutch outer 13 is rotated in the other direction, the rotation of the clutch outer 13 is not transmitted to the clutch inner 12. Further, when a peripheral rotational speed of the ring gear 3 exceeds a peripheral rotational speed of the pinion after the engine is started, the rotation is not transmitted to a starter 5 side. That is, the one-way clutch 10 transmits the rotation only in one direction, wherein the number of rotation of the clutch outer 13 and the number of rotation of the pinion 7 are equal to each other. With respect to the rotation in the other direction, the rollers are released from the clutch inner and are brought into a free state.

The clutch cover 14 of the one-way clutch 10 is formed of a thin metal plate member, and includes a cylindrical outer peripheral surface 14a and a circular-disc-shaped portion 14b which is continuously formed with the outer peripheral surface and extends toward an inner peripheral side, wherein the outer peripheral surface and the circular-disc-shaped portion are bent making a right angle therebetween. The circular-disc-shaped portion 14b prevents the removal of constitutional parts such as the rollers 11 which constitute the one-way clutch 10 and a disc arranged adjacent to the rollers by wrapping these parts, and also assembles the one-way clutch 10 as an integral body by inwardly bending an end portion 14c of an outer peripheral surface on a side opposite to the circular-disc-shaped portion 14b.

A plurality of through holes 15 are formed in the outer peripheral surface 14a of the clutch cover 14 as parts to be detected for a rotational speed which are provided for the detection of the rotational speed. The plurality of through holes are formed in the outer peripheral surface at equal intervals in the circumferential direction. Since the clutch cover 14 is brought into close contact with the outer peripheral surface of the clutch outer 13 so that a wall thickness of the clutch cover 14 is small, a depth of the through hole is small and is set to a depth d1 which corresponds to a plate thickness of the clutch cover 14. For example, when a thickness of a metal plate member which forms the clutch cover is 0.5 mm, the depth d1 of the through hole 15 is 0.5 mm.

A circumferential annular groove 16 is formed on an outer peripheral surface of the clutch outer 13 along the same circumference in alignment with the through holes 15 formed in the clutch cover 14. A depth of the annular groove 16 is, although the depth depends on the performance of a sensor to be used, preferably approximately 2 to 3 mm to approximately 5 mm. In a state where the clutch cover 14 and the clutch outer 13 are integrally assembled to each other, the depth of the through hole 15 becomes a sum of a depth corresponding to the thickness d1 of the clutch cover and a depth d2 of the annular groove 16. The depth of the annular groove may be set larger.

A magnet switch 21 is fixed to a side portion of the starter 5. The magnet switch is configured such that a plunger is attracted by energizing a plunger coil arranged inside the magnet switch so that the pinion 7 is pushed out and is meshed with the ring gear 3 by a drive lever. Accordingly, the engine can be started by rotating the starter 5 through such meshing of the pinion 7 with the ring gear 3.

The control device 20 is connected with a signal line 8a from the rotational speed detection sensor 8 which is positioned on an outer periphery of the one-way clutch 10, and a signal line 9a from the rotational speed detection sensor 9 which detects a rotational speed of the ring gear 3. Further, to a drive part (DRV) of the control device 20, a power source line 5a through which power is supplied to the relay 4a, and a power source line 21a through which power is supplied to the magnet switch 21 are connected.

Next, the manner of operation of the starter 5 according to this embodiment is explained. In starting the engine 1, power is supplied to the magnet switch 21 in response to a signal from the control device 20, the plunger is attracted so that a drive lever pushes out the pinion 7 and thereby the pinion 7 is meshed with the ring gear 3. Then, power is supplied to the starter 5 from the battery 4 via the relay 4a so that the starter 5 is rotated, and the ring gear 3 is rotated due to the rotation of the starter 5 and the engine 1 is started. When the engine is started, the rotation of the ring gear 3 is not transmitted to a starter 5 side by the one-way clutch 10, and the supply of power to the starter 5 is stopped.

Next, an example which uses rotational speeds which are detected by the rotational speed detection sensor 8 and the rotational speed detection sensor 9 is explained hereinafter. The control device 20 stops the engine 1 temporarily when a condition for allowing a temporary stop of the engine such as a stop of a vehicle at an intersection or the like during driving of the vehicle is satisfied, and the control device 20 can restart the engine by rotating the starter 5 when a restart condition is satisfied.

The control device 20 compares a rotational speed detected by the rotational speed detection sensor 9 which is connected to the crankshaft 2 of the engine 1 with a rotational speed detected by the rotational speed detection sensor 8 which detects a rotational speed of the pinion 7 interlocked with the starter 5 to each other and, for example, when the starter 5 is rotated and a peripheral speed of the pinion 7 and a peripheral speed of the ring gear 3 approximately agree with each other, the pinion 7 and the ring gear 3 are meshed with each other so that the engine 1 is started.

When a vehicle stops at an intersection or the like during driving of a vehicle, the engine 1 is brought into an idling state. When an engine stop condition is satisfied in this state, for example, when a predetermined time elapses, the engine 1 is stopped so that fuel consumption is reduced. When a condition for restarting the engine is satisfied during such a stop of the vehicle, the engine 1 is restarted. The control device 20 performs the temporary stop and the restart of the engine. In restarting the engine in response to a restart request, even when a rotational speed of the engine is falling, a peripheral speed of the pinion 7 and a peripheral speed of the ring gear 3 approximately agree with each other and hence, a restart can be rapidly performed without generating abnormal sounds or a meshing failure at the time of gear meshing.

Further, even when a peripheral speed of the pinion 7 and a peripheral speed of the ring gear 3 do not agree with each other, a lowering amount of a rotational speed during a stop of the engine is estimated, and the pinion 7 is meshed with the ring gear 3 at a estimated rotational speed thus rapidly performing a restart. Further, falling of a rotational speed of the ring gear 3 and the increase of a rotational speed of the pinion 7 of the starter at the time of starting are estimated and the pinion can be meshed with the ring gear 3 at an estimated rotational speed.

Figure 5:
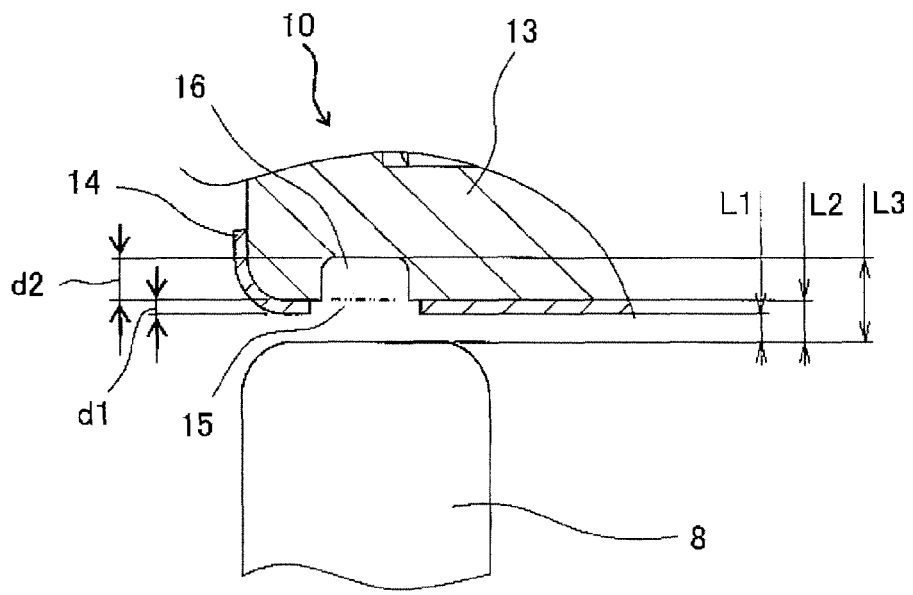
FIG. 5 is a cross-sectional view of an essential part showing the positional relationship between the clutch outer, an essential part of the clutch cover, and a rotational speed detection sensor.

The through hole 15 for signal detection according to this embodiment is, as shown in FIG. 5, deeply formed such that a depth of a bottom surface of the through hole 15 is d2, and assuming a distance from the rotational speed detection sensor 8 to an outer peripheral portion of the clutch cover 14 as L1, a distance from the rotational speed detection sensor 8 to an outer peripheral portion of the clutch outer 13 as L2, and a distance from the rotational speed detection sensor 8 to a bottom surface of the annular groove 16 formed in the clutch outer 13 as L3, the relationship of L1<L2<L3 is established.

When a magnetic sensor is used as the rotational speed detection sensor 8, the signal detection is performed at L1 and L3 and hence, the signal detection can be performed with largely improved stability compared to the signal detection at L1 and L2 in a case where the annular groove 16 which is formed in the outer peripheral portion of the clutch outer 13 is not provided. Further, the annular groove 16 for making a signal stable by increasing a depth of the through hole 15 is formed on an outer peripheral surface of the clutch outer 13 in the circumferential direction and hence, the annular groove 16 can be formed simultaneously with the forming of the clutch outer by molding, and the clutch outer 13 can be also made light-weighted with the simple constitution.

A part to be detected for a rotational speed may be also formed as follows without forming the through hole in the clutch covers 14. An outer peripheral portion of the clutch outer is temporarily covered with the clutch cover 14 and, thereafter, a portion of the clutch cover 14 which is positioned above the annular groove 16 is pressed into the inside of the annular groove 16 by a punch or the like thus forming a recessed portion on the clutch cover 14 which becomes the part to be detected for a rotational speed.

The control device 20 rotates the pinion 7, obtains a peripheral speed of the pinion 7 from a rotational speed of the pinion 7 detected by the rotational speed detection sensor 8, obtains peripheral speed of the ring gear 3 from a rotational speed of the ring gear 3 detected by the rotational speed detection sensor 9, and when the peripheral speed of the pinion 7 and the peripheral speed of the ring gear 3 agree with each other, the magnet switch 21 is operated so that the pinion 7 is moved in the axial direction and thereby the pinion 7 is meshed with the ring gear 7. Two gears have the same peripheral speed and hence, two gears are meshed with each other smoothly without generating abnormal sounds or the like and thereby the engine 1 can be started rapidly.

Figure 6:
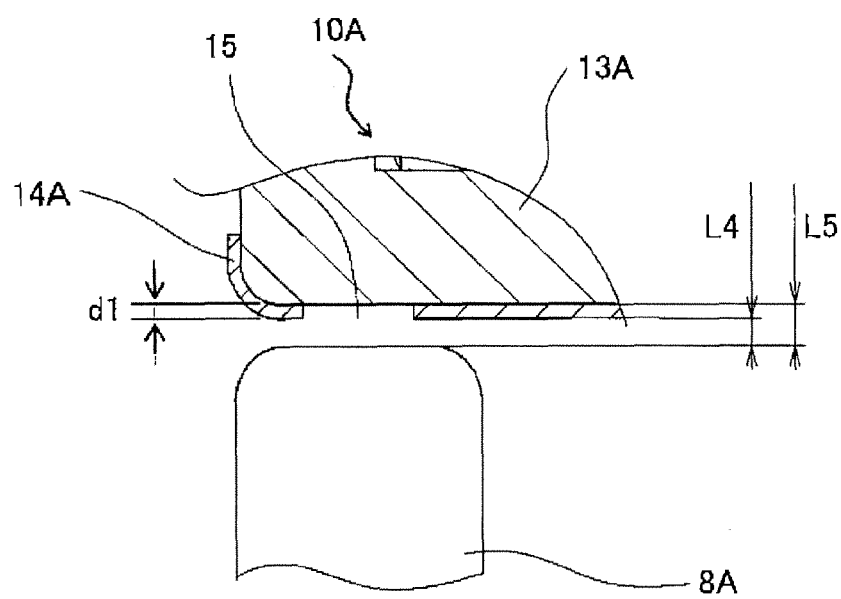
FIG. 6 is a cross-sectional view of an essential part showing the positional relationship between a clutch outer, an essential part of a clutch cover, and a rotational speed detection sensor according to another embodiment where a groove is not formed on a clutch outer.

Another embodiment is explained in detail in conjunction with FIG. 6. FIG. 6 is a cross-sectional view showing an essential part of another embodiment of the starter. Compared to the above-mentioned embodiment, this embodiment is characterized in that a part to be detected for a rotational speed where a rotational speed is detected by a rotational speed detection sensor is formed of only through holes. Other constitutions of this embodiment which are substantially identical to the corresponding constitutions of the above-mentioned embodiment are given the same symbols and the detailed explanation of other constitutions is omitted.

In this embodiment, a one-way clutch 10A is configured such that an annular groove is not formed on an outer peripheral surface of a clutch outer 13A. By using a material whose surface is a glossy surface such as a plated steel sheet as a material of a clutch cover 14A, an outer peripheral portion of the clutch cover 14A can reflect light. Further, dark color treatment is applied to a surface of the clutch outer 13A. To be more specific, as a result of heat treatment from a viewpoint of enhancing rigidity of the one-way clutch 10A, an outer peripheral portion of the clutch outer 13A becomes black which is hard to reflect light. In this embodiment, an optical sensor is used as a rotational speed detection sensor 8A.

As a result, a groove for increasing a depth of the through holes formed in the clutch outer 13A is not formed in the clutch outer 13A. Accordingly, even in the case there is no large difference between a distance L4 between the rotational speed detection sensor 8A and the clutch cover 14A and a distance L5 between the rotational speed detection sensor 8A and the clutch outer 13A, when an optical sensor is used as the rotational speed detection sensor 8A, it is possible to detect a signal in a stable manner without using an additional member for reflecting light.

Although an example where a signal can be obtained in a stable manner using the clutch cover 14A to which glossy treatment is applied and the clutch outer 13A to which dark color treatment is applied has been explained, by applying bright color treatment such as white to a clutch cover and by applying dark color treatment to a surface of the clutch outer which is exposed via the through hole formed in the clutch cover, it is possible to make a signal obtained by emphasizing the contrast stable.

Figure 7:
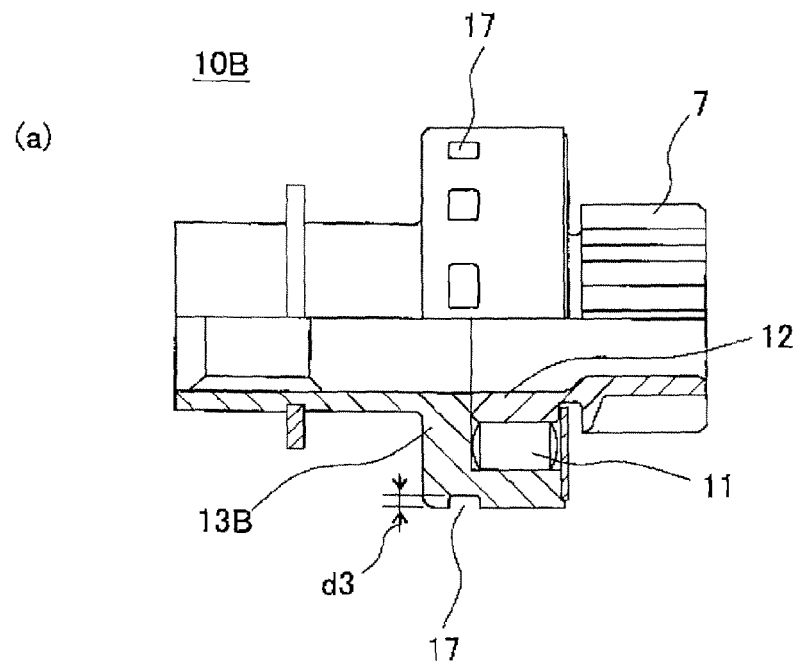
Figure 7:
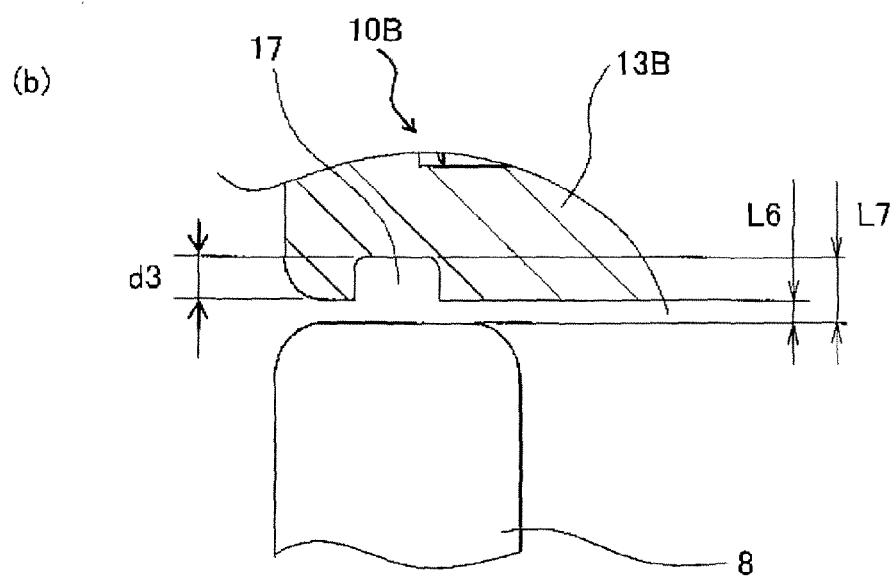

Still another embodiment is explained in detail in conjunction with FIG. 7(a) and FIG. 7(b). FIG. 7(a) and Fig. (b) show still another embodiment of the starter, wherein FIG. 7(a) is a front view with a part broken away of a one-way clutch, and FIG. 7(b) is a cross-sectional view showing an essential part of the one-way clutch. Compared to the above-mentioned embodiments, this embodiment is characterized in that a part to be detected for a rotational speed where a rotational speed is detected by a rotational speed detection sensor is formed of only recessed portions. Other constitutions of this embodiment which are substantially identical to the corresponding constitutions of the above-mentioned embodiments are given the same symbols and the detailed explanation of other constitutions is omitted.

In this embodiment, in a one-way clutch 10B, a clutch cover is not mounted on an outer periphery of a clutch outer 13B, and a rotational speed detection sensor 8B is arranged such that the rotational speed detection sensor 8B directly faces an outer peripheral surface of the clutch outer in an opposed manner. A plurality of recessed portions 17 are formed on an outer peripheral surface of the clutch outer 13B at equal intervals in the circumferential direction. A depth of the recessed portion 17 is indicated by d3, and the depth d3 is set larger than a distance L6 between the clutch outer 13B and the rotational speed detection sensor 8.

In the embodiment of the present invention having the above-mentioned constitution, concaves and convexes are formed due to stepped portions defined between the recessed portions 17 formed on the circumference of the outer peripheral surface of the clutch outer 13B and the outer peripheral surface of the clutch outer 13B. Accordingly, when the clutch outer 13B is rotated, a magnetic force from the sensor is applied to the concaves and convexes so that a concave-and-convex state is detected as pulses. A signal indicative of the concave-and-convex state is detected as a sum L7 of the distance L6 and the depth d3 of the recessed portion and hence, a level of the signal detection becomes large so that a rotational speed signal can be obtained in a stable manner. Accordingly, the clutch outer 13 can be made light-weighted with the simple constitution and hence, an engine can be started rapidly.

In the above-mentioned embodiments, the explanation has been made with respect to the cases where the through hole or the recessed portion is formed as the part to be detected for a rotational speed. However, the one-way clutch may be configured such that a non-magnetic body and a magnetic body are alternately (preferably at equal intervals) embedded in a clutch cover, and a magnetic sensor detects a rotational speed based on a change in magnetism generated by the magnetic bodies. Further, a one-way clutch may be also configured such that a bright portion and a dark portion are alternately (preferably at equal intervals) arranged on the clutch cover, and an optical sensor may detect a rotational speed based on a change in reflectances of the bright portion and the dark portion.

According to the embodiments of the present invention, even with respect to the starter provided with the one-way clutch having the clutch cover, it is no more necessary to provide a rotary member for detecting a rotational speed such as a pulser gear on the rotary shaft of the starter and hence, a signal for detecting a rotational speed can be detected using existing parts constitution without modification. Further, it is unnecessary to provide additional parts and hence, a rotational speed of the pinion can be detected without elongating a size of the starter in the axial direction.

Compared to a case where a signal is detected based on only a wall thickness of a signal detection portion of an outer peripheral portion of a clutch cover, by adding the space having a predetermined depth to the clutch outer, a sum of a size of the outer peripheral portion of the clutch cover and a size of the predetermined space of the clutch outer to a bottom portion can be detected and hence, the signal detection performance for detecting a rotational speed can be largely enhanced. That is, the detection of a rotational speed can be surely performed.

By applying gross treatment to the clutch cover, the reflectance of the clutch cover can be increased, and the inside of the through hole is dark so that the reflectance is lowered. That is, with the use of an optical sensor, a contrast between brightness and darkness is increased and hence, amplitude of a signal is increased so that a signal indicative of a rotational speed can be obtained in a stable manner.

The clutch cover includes the circular-disc-shaped portion which is continuously formed with the outer peripheral surface and extends toward an inner peripheral side, wherein the circular-disc-shaped portion is formed so as to wrap members which constitute the one-way clutch. That is, the members which constitute the one-way clutch are held in a state where the members are wrapped by the circular-disc-shaped portion of the clutch cover and hence, the one-way clutch is assembled as an integral body with the simple constitution.

A rotational speed of the pinion and a rotational speed of the engine are compared with each other, and when both peripheral speeds agree with each other, for example, the pinion is meshed with the ring gear so that the engine is restarted by rotating the starter. Accordingly, the engine can be started rapidly and smoothly in response to a driver's request without generating abnormal sounds at the time of gear meshing.

Although the embodiments of the present invention have been explained in detail heretofore, the present invention is not limited to the above-mentioned embodiments, and various changes in design can be made without departing from the spirit of the present invention called for in Claims. For example, although the case where the magnetic sensor is used as the rotational speed detection sensor is explained in the above-mentioned embodiments, various sensors such as an optical sensor which uses a light receiving element or a sensor which uses sound waves can be used.

DESCRIPTION OF REFERENCE NUMERALS AND SIGNS

1: engine, 2: crankshaft, 3: ring gear, 4: battery, 4a: relay, 5: starter, 6: armature, 6a: armature shaft, 7: pinion, 8, 8A: rotational speed detection sensor, 9: rotational speed detection sensor, 10, 10A, 10B: one-way clutch, 11: roller, 12: clutch inner, 13, 13A, 13B: clutch outer, 14, 14A: clutch cover, 14a: outer peripheral surface, 14b: circular-disc-shaped portion, 14c: end portion, 15: through hole (part to be detected for rotational speed which is formed on clutch cover), 16: annular groove formed on outer peripheral surface of clutch outer, 17: recessed portion, 20: control device, 21: magnet switch, d1: depth of through hole, d2: depth of annular groove, d3: depth of recessed portion

The invention claimed is:

1. A starter comprising:
a pinion which transmits a rotational drive force of the starter to a ring gear of a crankshaft of an engine;
an armature shaft which pushes out the pinion to the ring gear;
a one-way clutch which is arranged between the pinion and the ring gear so as to prevent the transmission of a rotational drive force of the engine to an armature; and
a rotational speed detection device configured to detect a rotational speed of the pinion, wherein
the rotational speed detection device comprises:
a part to be detected for a rotational speed which is formed on a periphery of the one-way clutch; and
a rotational speed detection sensor configured to detect the part to be detected for a rotational speed, wherein
an outer peripheral surface of a clutch outer is covered with a clutch cover,
the part to be detected for a rotational speed is formed of a through hole formed on a circumference of the clutch cover, and a circular circumferential groove formed on an outer peripheral surface of the clutch outer along the circumference on which the through hole is formed; and
the rotational speed detection sensor is arranged in such a state where the rotational speed detection sensor faces the through hole and the groove in an opposed manner.

2. The starter according to claim 1, wherein the clutch cover includes a circular-disc-shaped portion which is formed continuously with the outer peripheral surface and extends toward an inner peripheral side, and the circular-disc-shaped portion is formed so as to wrap members which constitute the one-way clutch.

3. The starter according to claim 1, wherein a plurality of through holes are formed on the outer peripheral surface of the clutch cover at equal intervals along a circumference of the clutch cover,
   wherein the plurality of through holes comprises the through hole.

4. The starter according to claim 1, wherein the starter further includes a control device configured to control moving the pinion for starting an engine by making the pinion meshed with the ring gear based on a rotational speed of the pinion detected by the rotational speed detection sensor and a rotational speed of the engine detected by a rotational speed detection sensor of the engine.

5. The starter according to claim 4, wherein the control device is configured to move the pinion when a peripheral speed obtained from a rotational speed of the pinion and a peripheral speed obtained from a rotational speed of the ring gear agree with each other.

6. The starter according to claim 5, wherein the control device, in automatically restarting the engine in a state where a front drive crankshaft of the engine is being rotated after automatically temporarily stopping the engine, is configured to perform a control of rotatably driving the starter and, thereafter, when peripheral speeds of the pinion and the ring gear agree with each other, move the pinion so as to make the pinion engaged with the ring gear.

* * * * *